(12) United States Patent
Leyland et al.

(10) Patent No.: US 7,353,384 B2
(45) Date of Patent: Apr. 1, 2008

(54) COLLAPSING CHAINED CREDENTIALS

(75) Inventors: Paul Christopher Leyland, Cambridge (GB); Roger Michael Needham, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 826 days.

(21) Appl. No.: 10/125,121

(22) Filed: Apr. 17, 2002

(65) Prior Publication Data

US 2003/0200430 A1    Oct. 23, 2003

(51) Int. Cl.
*H04L 9/00*     (2006.01)
(52) U.S. Cl. .................. 713/157; 713/155; 713/175; 709/225; 709/226; 709/229; 380/229; 380/28
(58) Field of Classification Search ............... 713/157
See application file for complete search history.

(56) References Cited

U.S. PATENT DOCUMENTS

| | | | | |
|---|---|---|---|---|
| 5,224,163 | A * | 6/1993 | Gasser et al. ............. | 380/30 |
| 6,134,550 | A * | 10/2000 | Van Oorschot et al. ........ | 707/9 |
| 6,738,899 | B1 * | 5/2004 | Cordery .................. | 713/156 |
| 6,754,661 | B1 * | 6/2004 | Hallin et al. ............. | 707/100 |
| 2001/0014943 | A1 * | 8/2001 | Wray ..................... | 713/157 |
| 2002/0044648 | A1 * | 4/2002 | Arazi .................... | 380/30 |
| 2003/0023849 | A1 * | 1/2003 | Martin et al. ............ | 713/176 |

OTHER PUBLICATIONS

Mason, A., VPNs and VPN Technologies, Jan. 2002, Cisco Press, http://72.14.207.104/search?q=cache:gdtwM-yh5d4J:www.ciscopress.com/articles/article.asp; Retrieved on Oct. 7, 2005.*
"Applied Cryptography, Protocols, Algorithms, and Source Code in C," Second Edition, by Bruce Schneier, pp. 466-482, pp. 566-572, pp. 604-605, & p. 722, 1996.

* cited by examiner

*Primary Examiner*—Emmanuel L. Moise
*Assistant Examiner*—Shewaye Gelagay

(57) ABSTRACT

An intermediate entity can generate a necessary credential to allow two other entities to bypass the intermediate entity when establishing communications between two other entities in a computing system represented by either a directed or an undirected graph. The intermediate entity receives credentials for communications links between itself and each of the other two entities. The intermediate entity also receives a chaining parameter associated with the intermediate entity. With the two credentials and the chaining parameter, the intermediate entity can compute a necessary credential to allow communication between the other two entities. In addition, the intermediate entity can compute the necessary credential independent of a security manager during the computation operation.

22 Claims, 5 Drawing Sheets

US 7,353,384 B2

COLLAPSING CHAINED CREDENTIALS

TECHNICAL FIELD

The invention relates generally to computer system security, and more particularly to collapsing chained credentials used in gaining authenticated access to a computing entity.

BACKGROUND OF THE INVENTION

Computer system security is essential in the modem online culture. One aspect of computer security is ensuring that an entity that is attempting to access another entity has rights to do so ("authorization"). Before authorizing the access by the entity, a computer security system must also verify the identity of the entity ("authentication"). Often, authentication and authorization are performed responsive to a login process in which a user or process provides an identifier and a secret value, such as a password or cryptographic key.

Security relationships among various entities have evolved to a point where one entity may rely on another entity's access rights to access a given resource. For example, if a first computer has rights to send a print job to a second computer, and the second computer has rights to send the print job to a networked printer, the first computer may attempt to submit the print job to the second computer (i.e., or the intermediate entity) for printing on the networked printer. This multi-stage access typically requires individual authentications and authorizations at each stage. That is, the first computer is authenticated and authorized to access the second computer, and the second computer is authenticated and authorized to access the networked printer.

At least two disadvantages are presented by the multi-stage authentication and authorization of the security process. First, in many configurations, authentication and authorization are performed with the involvement of a security manager. Often, this security manager is a process that maintains security data for many entities on a network. The multi-stage security process requires the security manager to perform authentication and authorization twice. In a busy network, the multi-stage security process can cause a bottleneck at the security manager. Second, each entity (e.g., each computer) must also participate in authentication and authorization, thereby expending resources of both entities and the security manager.

SUMMARY OF THE INVENTION

Embodiments of the present invention solve the discussed problems by collapsing chained credentials using a chaining parameter. As such, an intermediate entity can generate a necessary credential to allow two other entities to bypass the intermediate entity when establishing communications between the two other entities. The intermediate entity receives credentials for communications links between itself and each of the other two entities. The intermediate entity also receives a chaining parameter associated with the intermediate entity. With the two credentials and the chaining parameter, the intermediate entity can compute a necessary credential to allow communication between the other two entities. In addition, the intermediate entity can compute the necessary credential independent of a security manager during the computation operation.

In implementations of the present invention, articles of manufacture are provided as computer program products.

One embodiment of a computer program product provides a computer program storage medium readable by a computer system and encoding a computer program that generates a computed credential for establishing a communications link between a first node and a second node in a computing system. Another embodiment of a computer program product may be provided in a computer data signal embodied in a carrier wave by a computing system and encoding the computer program that generates a computed credential for establishing a communications link between a first node and a second node in a computing system.

The computer program product encodes a computer program for executing on a computer system a computer process for generating a computed credential for establishing a communications link between a first node and a second node in a computing system is provided. The computing system includes at least the first node, the second node, and a third node. A first credential is received for establishing a communications link between the third node and the first node. A second credential is received for establishing a communications link between the third node and the second node. A chaining parameter associated with the third node is received. The computed credential is computed for establishing the communications link between the first node and the second node based on the first credential, the second credential, and the chaining parameter.

In another implementation of the present invention, a method of generating a computed credential for establishing a communications link between a first node and a second node in a computing system is provided. The computing system includes at least the first node, the second node, and a third node. A first credential is received for establishing a communications link between the third node and the first node. A second credential is received for establishing a communications link between the third node and the second node. A chaining parameter associated with the third node is received. The computed credential is computed for establishing the communications link between the first node and the second node based on the first credential, the second credential, and the chaining parameter.

These and various other features as well as other advantages, which characterize the present invention, will be apparent from a reading of the following detailed description and a review of the associated drawings.

DETAILED DESCRIPTION OF THE INVENTION

Figure 1:
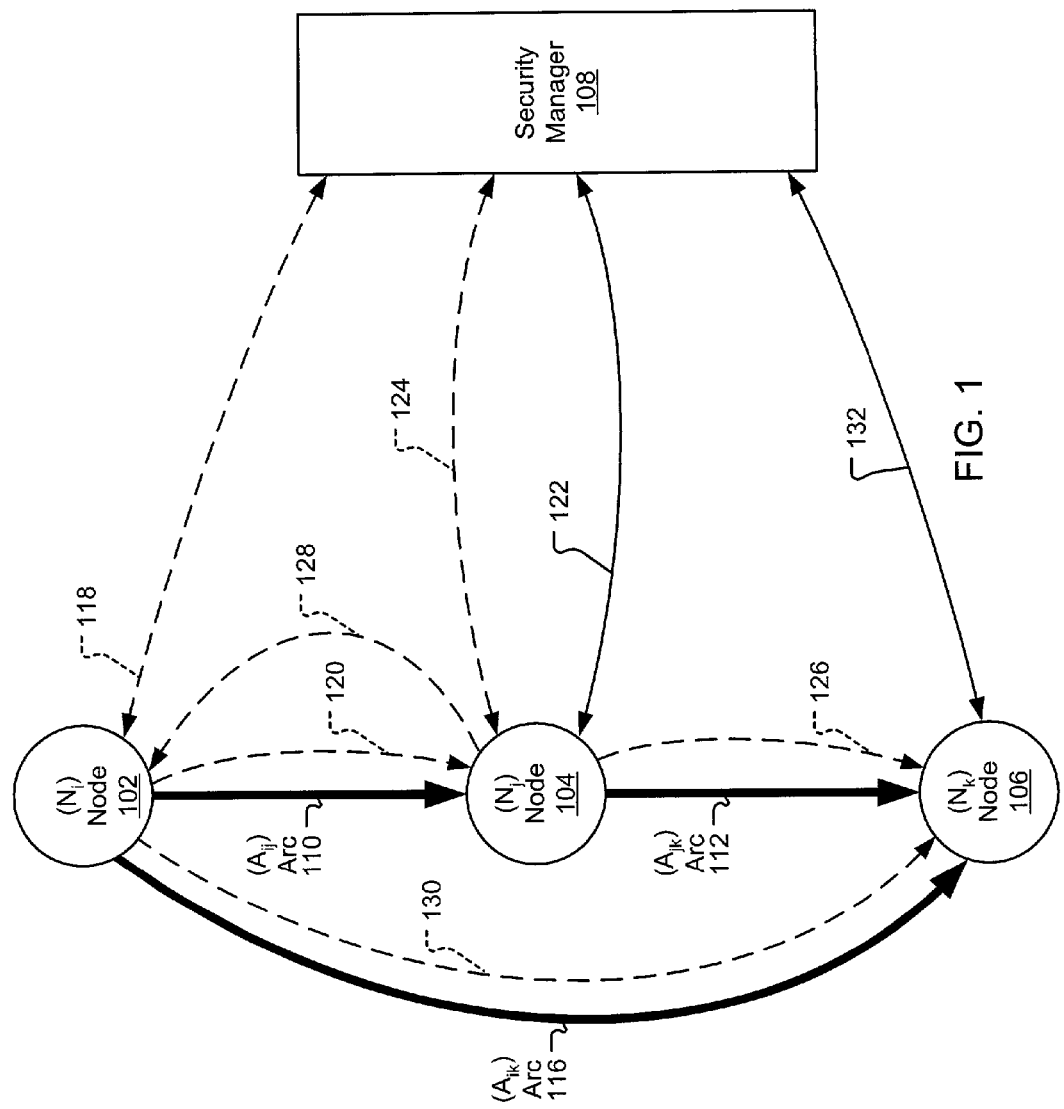
FIG. 1 illustrates an exemplary directed graph in an embodiment of the present invention.

Entities communicatively coupled within a computing system may be represented by a graph having nodes connected by arcs. Each entity (i.e., node) represents a computing process or device, such as a client, a server, a storage controller, an actuator, a sensor, etc. It should be understood that a "node" is not necessarily a physical device. For example, a printer may be a single device acting on behalf of several computers for printing, or several applications running on a single computer. Each node is communicatively coupled by means of a communications link, such as a network connection, a communications bus, etc., whether wired or wireless. Furthermore, access to each communications link is managed by a controller, such as web server verification module associated with the accessed node. For example, a consumer's client computer may be coupled via logical connections on the Internet to a retailer's web server, wherein access to the retailer's web server is controlled by a verification module in the web server. Likewise, both the consumer's computer and the retailer's computer may access a bank's server, which manages transactions with the consumer's bank account. See FIG. 3 for an exemplary illustration of such a configuration.

Communication links in such computer systems may be either directed or undirected. A directed graph may represent, for example, nodes coupled in a chain-of-command system, in which the nodes have an implicit or explicit manager-subordinate relationship (e.g., node A is a manager to the subordinate node B). Typically, a manager-subordinate relationship is descriptive of the manager's ability to command the subordinate, whereas the subordinate cannot command the manager. As such, the access control to the communication link between the two nodes is not considered symmetric.

An implicit relationship in a manager-subordinate relationship refers to a relationship in which there exists a second manager-subordinate relationship, that between a third node (node C) and the node A, wherein node A is the manager to the subordinate node B and node A is authorized to command actions of node C through node B. In an embodiment of the present invention, node A may obtain a credential to establish an explicit master-subordinate relationship between node A and C.

An example of a directed graph might include a RAID (Redundant Arrays of Independent Disks) storage controller communicating with a hard disk controller, where the RAID storage controller may command the hard disk controller to access data stored on a hard disk, but the hard disk controller does not command the RAID storage controller. See FIG. 1 for an exemplary illustration of a directed graph.

In contrast, an undirected graph represents nodes in which there is no chain-of-command relationship. Instead, the relationship between nodes connected by an arc is more of a peer-to-peer relationship. As such, the access control to the communications link between the two nodes may be considered symmetric. Typically, the command abilities of nodes in an undirected graph are not limited in a given direction. Although a credential authenticating access from a first node to a second node may differ from a credential authenticating access from the second node to the first node, the two related credentials are equivalent from a cryptographic perspective, and one credential may be converted to the other related credential using a chaining parameter in an undirected graph. An example of an undirected graph might include the nodes in the e-commerce example of FIG. 3.

FIG. 1 illustrates an exemplary directed graph in an embodiment of the present invention. For the purpose of the descriptions herein, it is helpful to set out the applicable notation. Generally, the directed graph includes nodes $N_i$, $N_j$, $N_k$, . . . , although only node 102 ($N_i$), node 104 ($N_j$) and node 106 ($N_k$) are shown in FIG. 1. A directed graph need not be fully connected or cycle free and may include an arbitrarily large number of nodes. There is at most one arc in each direction between any two nodes. An arc connecting head node $N_i$ and tail node $N_j$ is denoted by $A_{ij}$, which in a directed node also indicates the direction of the manager-subordinate relationship. In FIG. 1, arcs are represented by bold solid arrows 110, 112, and 114.

There exists a security manager 108 that issues credentials to one or more entities, although it should also be understood that an entity may have already received a needed credential from another source (e.g., a security manager, another entity, by computation) and has stored it in an accessible storage location for later retrieval. The security manager 108 may be a single entity or a distributed system containing multiple security manager entities. The security manager 108 also helps manage access to an arc by the various nodes, based on whether a node can present a valid credential for the arc.

In one embodiment, the security manager 108 implements a standard RSA (Rivest, Shamir, and Adelman) cryptosystem with parameters e, d, and N, where e is the public exponent, d is the private exponent, and N is the public modulus. The security manager 108 makes e and N publicly available to nodes in the system and keeps d secret from the nodes. It is assumed that factoring N is computationally infeasible. In the RSA cryptosystem, e and d are inverses in the sense that a message encrypted with the quantity e may be decrypted by the use of d and vice versa.

The security manager 108 maintains a datastore containing security information for each node. First, two random primes numbers $p_i$ and $r_i$ are privately stored in the datastore in association with each node, such that $N^{-1/3e} < p_i$ and $r_i < N^{-1/3}$. No two prime numbers associated with nodes in the system are equal. In one embodiment, the term "prime numbers" is inclusive of strong pseudoprime numbers (i.e., proven prime numbers are not required). Second, a chaining parameter may be stored in the datastore in association with each node. In one embodiment, a chaining parameter includes $(p_i r_i^2)^{-e}$ mod N, wherein "includes" refers to the value $(p_i r_i^2)^{31\ e}$ mod N or other cryptographic equivalents. The security manager 108 makes the chaining parameters available to nodes upon request.

A node requires a credential to access a given arc in the directed graph. The security manager 108 is capable of generating the credential $(p_i r_j^2)^e$ mod N for an arc $A_{ij}$ (i.e., credential$_{ij}$) and the credential $(r_i^2 p_j)^e$ mod N for an arc $A_{ji}$ (i.e., credentials$_{ji}$), based on the parameters in its datastore. It should be understood that credentials can include other cryptographic equivalents. The security manager 108 may also perform RSA decryption as required because the security manager 108 maintains a copy of the private exponent d.

As a preliminary consideration, it is believed that one cannot extract cube or higher roots of an integer x modulo a composite integer N without knowing the factorization of N. We assume that $x^3 > N$. Therefore, given e, N and a credential of the form $(p_i r_j^2)^e$ mod N, an unauthorized node cannot compute $p_i$, $r_i$, $p_j$, and $r_j$, or a credential for $A_{ij}$ or $A_{ji}$.

To access an arc $A_{ij}$ in a directed graph, the node 102 first obtains a credential for arc $A_{ij}$. In an embodiment of the present invention, the node 102 is initially assumed to possess no credentials. When the node 102 ($N_i$) attempts to access node 104 ($N_j$), the node 102 requests from the security manager 108 a credential to access the node 104 via the arc 110. The dashed credential arrow 118 represents the request and response pair of this credential communication. The node 102 can then present the credentials via the dashed credential arrow 120 to the verification module that controls access to the node 104. If the verification module can verify the credential, it grants the node 102 with access to the node 104, thereby establishing the communications link represented by the arc 110.

In one embodiment, the verification module sends the credential to the security manager 108 via solid verification arrow 122 and requests verification of the credential. The security manager 108 verifies the presented credential by computing a computed credential based on its stored values of $p_i$ and $r_j$. If the computed credential matches the credential presented by node 102, then the security manager 108 indicates to the verification module that the presented credential is deemed valid. The verification module can then allow node 102 to access node 104. Otherwise, access to node 104 by node 102 is denied.

In another embodiment, the verification module sends the credential$_{ij}$ to the security manager 108 via solid verification arrow 122 and request verification of the credential. The security manager 108 verifies the presented credential$_{ij}$ by using d to perform an RSA decryption of the presented credential to create a decryption result. If the decryption result matches $p_i r_j^2$ mod N, then the credential is deemed valid and the verification module can allow node 102 to access node 104. Otherwise, access to node 104 by node 102 is denied. Other known verification methods are also contemplated within the scope of the present invention.

At another point in time, such as responsive to a command received from node 102 to carry out an implicit manager-subordinate relationship between nodes 102 and 106, the node 104 ($N_j$) attempts to access the node 106 ($N_k$) via the arc 112 ($A_{jk}$). To access an arc $A_{jk}$, the node 104 first obtains a credential for arc $A_{jk}$ via the dashed credential arrow 124. The node 104 can then present the credential via the dashed credential arrow 126 to the verification module that controls access to the node 106. If the verification module can verify the credential, it grants the node 104 with access to the node 106, thereby establishing the communications link represented by the arc 112.

However, in an embodiment of the present invention, the node 104 may also receiving one or more chaining parameters from the security manager 108 via the dashed credential arrow 124. For example, in addition to the credential$_{jk}$, the node 104 may also receive a chaining parameters. Therefore, the node 104 may compute a credential$_{jk}$ based on the two credentials it possesses (i.e., credential$_{ij}$ received from node 102 and credential$_{jk}$ received from the security manager 108), and the chaining parameter$_j$ using the following computation:

$$\text{credential}_{ik} = \text{credential}_{ij} \cdot \text{credential}_{jk} \cdot \text{chaining parameter}_j$$
$$= (p_i r_j^2)^e \cdot (p_j r_k^2)^e \cdot (p_j r_j^2)^{-e} \bmod N$$
$$= (p_i r_j^2 p_j r_k^2)^e \cdot (p_j r_j^2)^{-e} \bmod N$$
$$= (p_i r_k^2)^e \bmod N$$

The computation of the computed credential$_{ik}$ involves a form of multiplication, as indicated by the operator "·". The newly computed credential$_{ik}$ may then be transmitted to the node 102 via the dashed credential arrow 128. The node 102 may then use the credential$_{ik}$ to establish an explicit manager-subordinate relationship with node 106 via a communications link represented by arc 116 by transmitting the credential$_{ik}$ via the dashed credential arrow 130 to the verification module associated with node 106. If the verification module of node 106 is able to verify the credential$_{ik}$ via the security manager 108 and the solid authentication arrow 132, the node 102 is granted access to the node 106 via the communications link represented by the arc 116.

Figure 2:
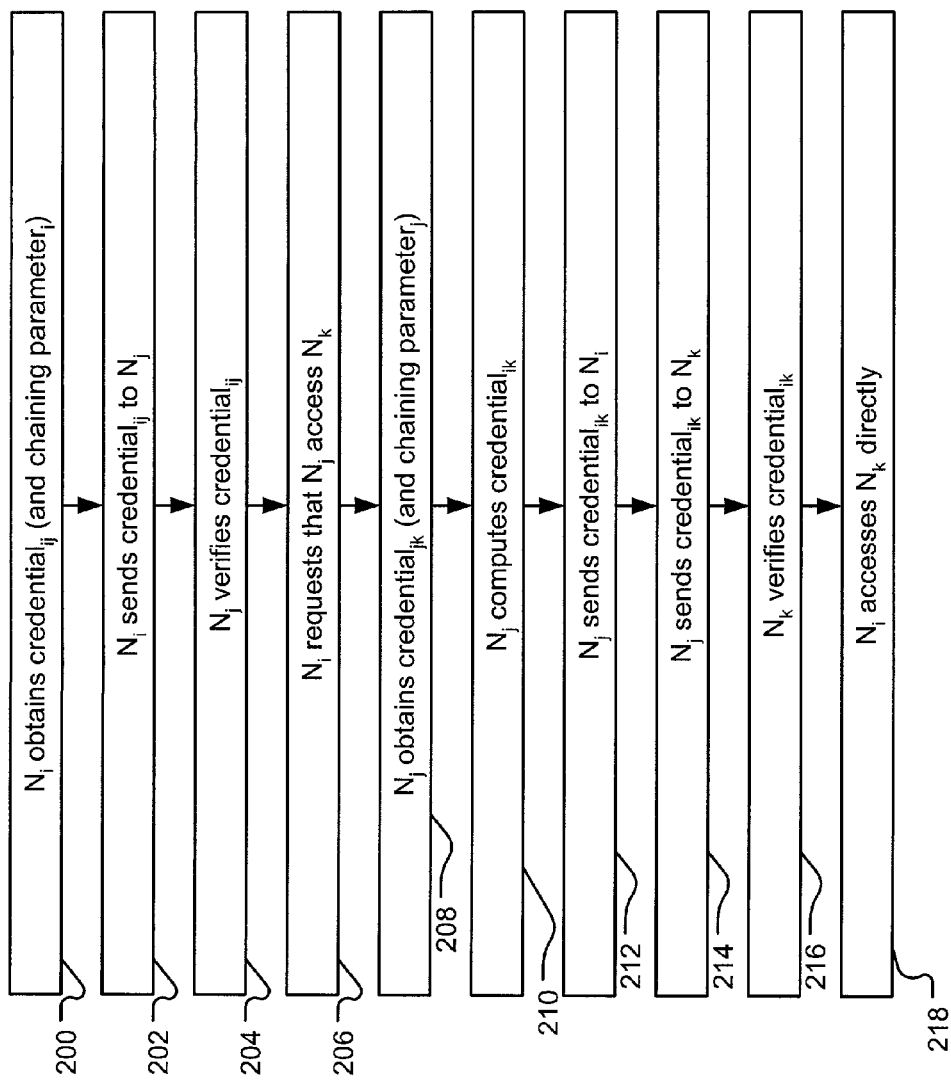
FIG. 2 depicts exemplary operations for collapsing chained credentials in a directed graph in accordance with the present invention.

FIG. 2 depicts exemplary operations for collapsing chained credentials in a directed graph in accordance with the present invention. The directed graph has at least nodes $N_i$, $N_j$, and $N_k$ in which the nodes have the same manager-subordinate relationships as depicted in FIG. 1. In a credential operation 200, node $N_i$ obtains a credential$_{ij}$ from a security manager. The node $N_i$ may also obtain a chaining parameters$_i$. In a transmission operation 202, node $N_i$ transmits the credentials to the verification module of node $N_j$, which verifies the credential$_{ij}$ via the security manager in a verification operation 204. If the credentials is verified, access by the node $N_i$ to the node $N_j$ is granted and node $N_i$ requests that node $N_j$ access node $N_k$ in a request operation 206.

In order to access node $N_k$, node $N_j$ obtains a credential$_{jk}$ from a security manager in a credential operation 208. To collapse the chained credentials credential$_{ij}$ and credential$_{jk}$, node $N_j$ also obtains a chaining parameter$_j$ in credential operation 208. If the verification module associated with node $N_k$ verifies the credential$_{jk}$, node $N_j$ may access node $N_k$.

However, having obtained credential$_{ij}$ and credential$_{jk}$, and chaining parameter$_j$, node $N_j$ may also calculate a credential$_{ik}$ in a computation operation 210 to be used in establishing a communications link between nodes $N_i$ and $N_k$. In transmission operation 212, node $N_j$ transmits the credential$_{ik}$ to node $N_i$. In another transmission operation 214, node $N_i$ transmits the credential$_{ik}$ to the verification module of node $N_k$, which verifies the credential$_{ik}$ via the security manager in a verification operation 216. If the credential$_{ik}$ is verified, access to the node $N_k$ is granted the node $N_i$. Node $N_i$ can then access node $N_k$ directly (i.e., without using the intermediary access to node $N_j$) in an access operation 218.

Figure 3:
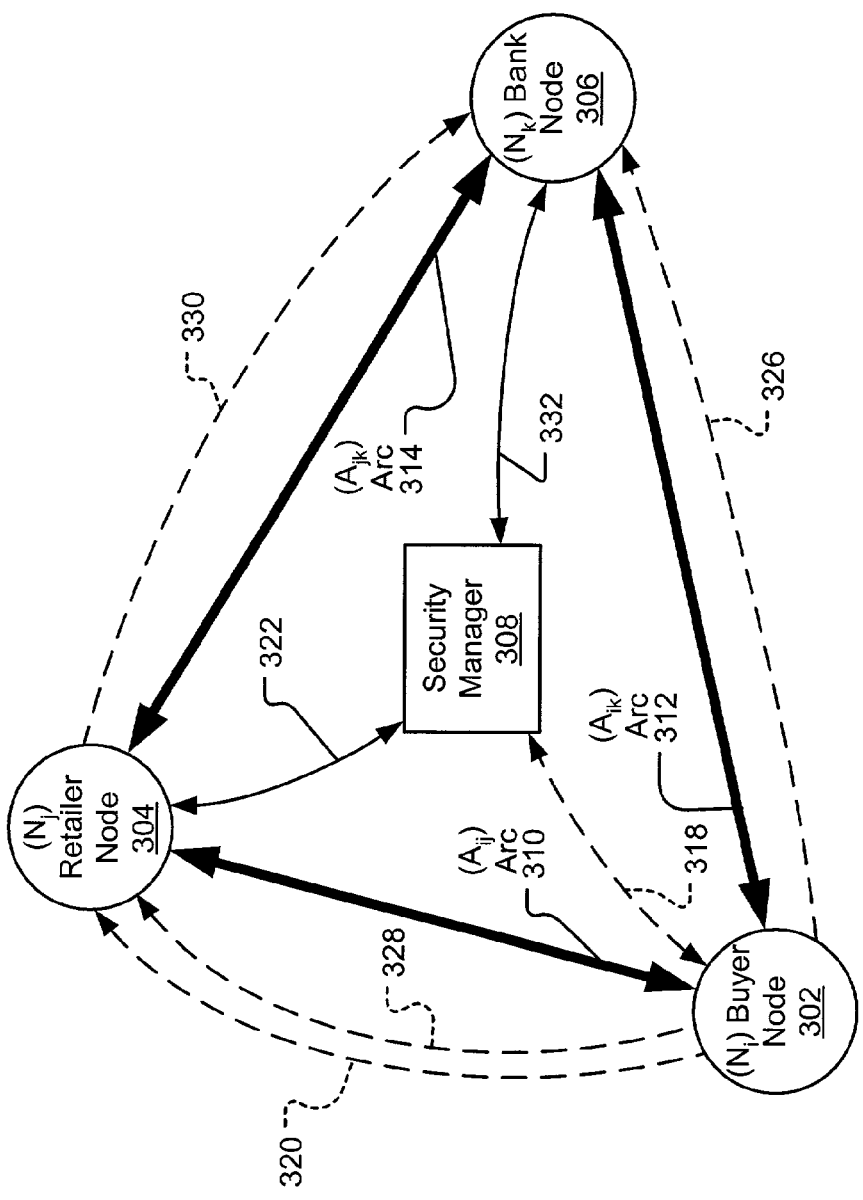
FIG. 3 illustrates an exemplary undirected graph in an embodiment of the present invention.

FIG. 3 illustrates an exemplary undirected graph in an embodiment of the present invention. Generally, the undirected graph includes nodes $N_i$, $N_j$, $N_k$, . . . , although only node 302 ($N_i$), node 304 ($N_j$) and node 306 ($N_k$) are shown in FIG. 3. An undirected graph need not be fully connected or cycle free and may contain an arbitrarily large number of nodes. There is at most one arc in each direction between any two nodes. An arc connecting node $N_i$ and node $N_j$ is denoted by $A_{ij}$, which in an undirected graph does not imply any direction in the peer-to-peer relationship. In FIG. 3, arcs are represented by bold solid arrows 310, 312, and 314.

There exists a security manager 308 that issues credentials to one or more entities. The security manager 308 may be a single entity or a distributed system containing multiple security manager entities. The security manager 308 also helps manage access to an arc by the various nodes, based on whether a node can present a valid credential for the arc.

In one embodiment, the security manager 308 implements a standard RSA cryptosystem with parameters e, d, and N, where e is the public exponent, d is the private exponent, and N is the public modulus. The security manager 308 makes e and N publicly available to nodes in the system and keeps d secret from the nodes. It is assumed that factoring N is computationally infeasible. In the RSA cryptosystem, e and d are inverses in the sense that a message encrypted with the quantity e may be decrypted by the use of d and vice versa.

The security manager 308 maintains a datastore containing security information for each node. First, a random prime number $p_i$ is privately stored in the datastore in association with each node, such that $N^{-1/3e} < p_i < N^{-1/3}$. No two prime numbers associated with nodes in the system are equal. In one embodiment, the term "prime numbers" is inclusive of strong pseudoprime numbers (i.e., proven prime numbers are not required). Second, a chaining parameter may be stored in the datastore in association with each node. In one embodiment, a chaining parameter includes $p_i^{-3e}$ mod N, wherein "includes" refers to the value $p_i^{-3e}$ mod N or other cryptographic equivalents. The security manager 308 makes the chaining parameters available to nodes upon request.

A node requires a credential to access a given arc in the undirected graph. The security manager 308 is capable of generating the credential $(p_i p_j^2)^e$ mod N for an arc $A_{ij}$ (i.e., credential$_{ij}$) or equivalently, as the graph is undirected, and the credential $(p_j p_i^2)^e$ mod N for an arc $A_{ji}$ (i.e., credential$_{ji}$), based on the parameters in its datastore. It should be understood that credentials can include other cryptographic equivalents. Note that given the credential$_{ij}$, a node may also compute the credential$_{ji}$ by using the chaining parameter $p_j^{-3e}$ mod N which it does by performing the computation $((p_i p_j^2)^e)^2 \cdot p_j^{-3e}$ mod N. It may be advantageous for the node $N_i$ to perform this computation when it receives the credential$_{ij}$ and chaining parameter from the security manager 308 and to store the credential$_{ji}$ for later use. The security manager 308 may also perform RSA decryption as required because the security manager 308 maintains a copy of the private exponent d.

To access an arc $A_{ij}$ in an undirected graph, the node 302 first obtains a credential for arc $A_{ij}$. An example of such access may include a consumer's connection to a retailer's web site. In an embodiment of the present invention, the node 302 is initially assumed to possess no credentials. When the node 302 ($N_i$) first attempts to access node 304 ($N_j$), the node 302 requests from the security manager 308 a credential to access the node 304 via the arc 310. The dashed credential arrow 318 represents the request and response pair of this credential communication. The node 302 can then present the credential via the dashed credential arrow 320 to the verification module that controls access to the node 304. If the verification module can verify the credential, it grants the node 302 with access to the node 304, thereby establishing the communications link represented by the arc 310.

In various embodiments, the verification module sends the credential$_{ij}$ to the security manager 308 via solid verification arrow 322 and requests verification of the credential. Two exemplary methods of verification are described with regard to FIG. 1.

At another point in time, the consumer may wish to access the web site for his or her bank, the node 302 ($N_i$) attempts to access the node 306 ($N_k$) via the arc 312 ($A_{ik}$). To access the arc $A_{ik}$, the node 302 first obtains a credential for arc $A_{ik}$ from the security manager 308 via the dashed credential arrow 318. The node 302 can then present the credential$_{ik}$ via the dashed credential arrow 326 to the verification module that controls access to the node 306. If the verification module can verify the credentials through solid verification arrow 332, it grants the node 302 with access to the node 306, thereby establishing the communications link represented by the arc 312.

However, in an embodiment of the present invention, the node 302 may also receive one or more chaining parameters from the security manager 308 via the dashed credential arrow 318. For example, in addition to the credential$_{ik}$, the node 302 may also receive a chaining parameter$_i$. Therefore, the node 302 may compute a credential$_{jk}$ based on the two credentials it possesses (i.e., credential$_{ij}$ and credential$_{jk}$ received from the security manager 308), and the chaining parameter$_i$ as follows.

First, the node 302 either computes the credential$_{ji}$ as described above or retrieves it from its store of pre-computed credentials.

Second, the node 302 performs the following computation:

$$\begin{aligned} \text{credential}_{jk} &= \text{credential}_{ji} \cdot \text{credential}_{ik} \cdot \text{chaining parameter}_i \\ &= (p_j p_i^2)^e \cdot (p_i p_k^2)^e \cdot p_i^{-3e} \bmod N \\ &= (p_i^3 p_j p_k^2)^e \cdot p_i^{-3e} \bmod N \\ &= (p_j p_k^2)^e \bmod N \end{aligned}$$

The computation of the computed credential$_{jk}$ involves a form of multiplication, as indicated by the operator "·". The newly computed credential$_{jk}$ may then be transmitted to the node 304 via the dashed credential arrow 328. The node 304 may then use the credential$_{jk}$ to establish a communications link with node 306 represented by arc 314 by transmitting the credential$_{jk}$ via the dashed credential arrow 330 to the verification module associated with node 306. If the verification module of node 306 is able to verify the credential$_{jk}$ via the security manager 308 and the solid authentication arrow 332, the node 304 is granted access to the node 306 via the communications link represented by the arc 314.

Figure 4:
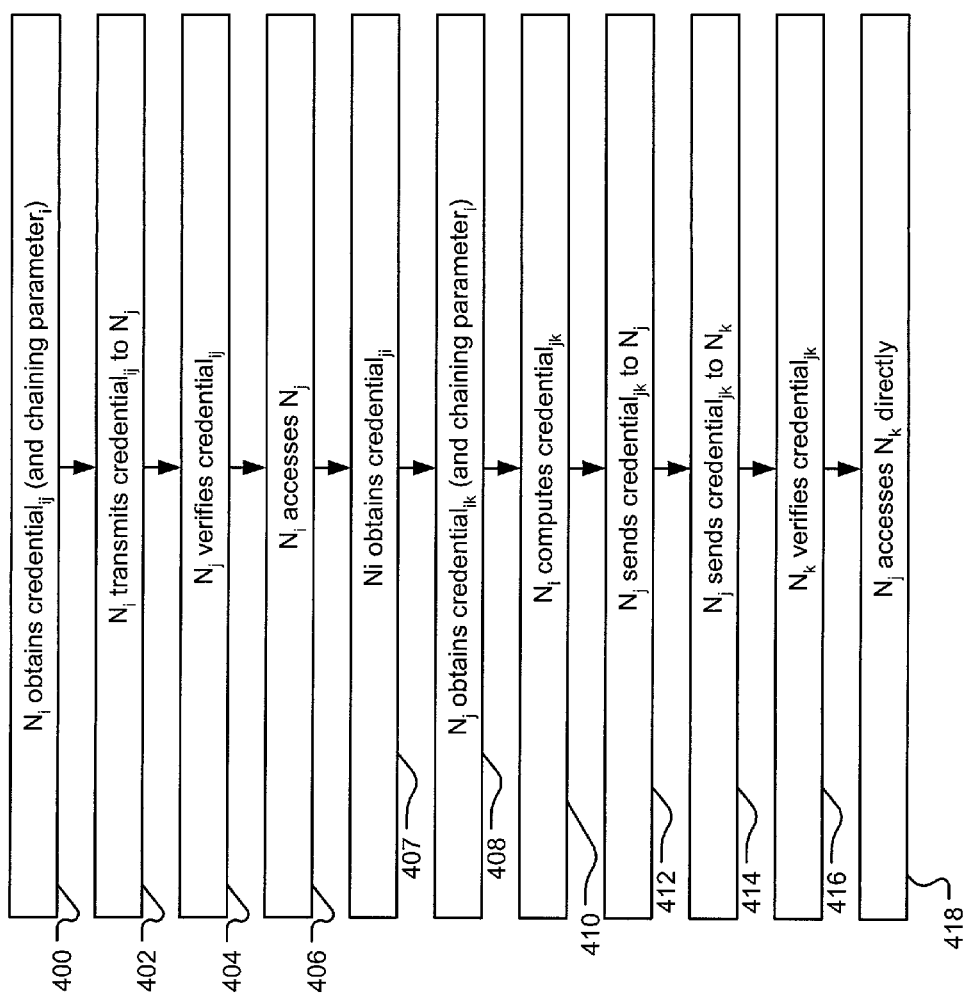
FIG. 4 depicts exemplary operations for collapsing chained credentials in an undirected graph in accordance with the present invention.

FIG. 4 depicts exemplary operations for collapsing chained credentials in an undirected graph in accordance with the present invention. The undirected graph has at least nodes $N_i$, $N_j$, and $N_k$ in which the nodes have the same manager-subordinate relationships as depicted in FIG. 3. In a credential operation 400, node $N_i$ obtains a credential$_{ij}$ from a security manager. The node $N_i$ may also obtain a chaining parameter$_i$. In a transmission operation 402, node $N_i$ transmits the credential$_{ij}$ to the verification module of node $N_j$, which verifies the credential$_{ij}$ via the security manager in a verification operation 404. If the credential$_{ij}$ is verified, access by the node $N_i$ to the node $N_j$ is granted and node $N_i$ accesses node $N_j$ in an access operation 406. In credential operation 407, node $N_i$ obtains the credential$_{ji}$ via computation using the chaining parameter$_j$, from another nodes (such as node$_j$), from an accessible storage location, or from the security manager.

In order to allow direct access between node $N_j$ and node $N_k$, node $N_i$ obtains a credential$_{jk}$ from a security manager in a credential operation 408. To collapse the chained credentials credential$_{ji}$ and credential$_{ik}$, node $N_i$ may also obtain a chaining parameters in a credential operation 408. Having obtained credentials credential$_{ji}$ and credential$_{ik}$, and chaining parameter$_i$, node $N_i$ may also calculate a credential$_{jk}$ in a computation operation 410 to be used in establishing a communications link between nodes $N_j$ and $N_k$. In transmission operation 412, node $N_i$ transmits the credential$_{jk}$ to node $N_j$. In another transmission operation 414, node $N_j$ transmits the credential$_{jk}$ to the verification module of node $N_k$, which verifies the credential$_{jk}$ via the security manager in a verification operation 416. If the credential$_{jk}$ is verified, access to the node $N_k$ is granted the node $N_j$. Node $N_j$ can then access node $N_k$ directly (i.e., without using an intermediary access to node $N_i$) in an access operation 418.

Figure 5:
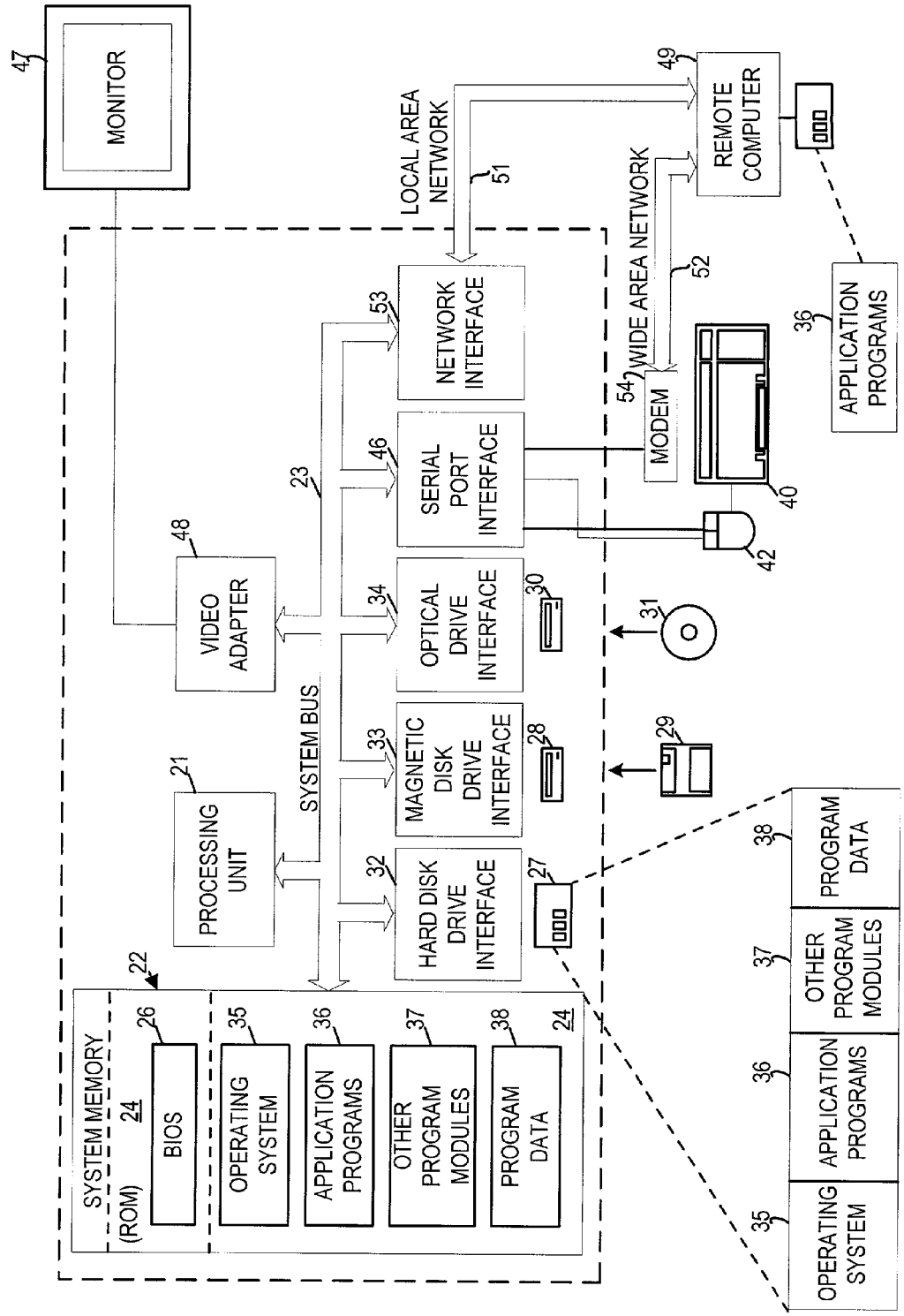
FIG. 5 illustrates an exemplary system useful for implementing an embodiment of the present invention.

The exemplary hardware and operating environment of FIG. 5 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, software of the present invention, including security manager software and communications and verification modules of the various nodes, may be incorporated as part of the operating system 35, application programs 36, or other program modules 37. The security parameters, including prime numbers, credentials and chaining parameters may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A computer program storage medium encoding a computer program for executing on a computer system a computer process for generating a computed credential for establishing a communications link between a first node ($N_i$) and a second node ($N_k$) in a computing system, wherein the computing system includes at least the first node ($N_i$), the second node ($N_k$), and a third node ($N_j$), the computer process comprising:

receiving a first credential for establishing a communications link between the third node ($N_j$) and the first node ($N_i$), wherein the first credential includes $(p_i r_j^2)^e$ mod $N$, wherein e is a public exponent, N is a public modulus, $p_i$ is a random prime number associated with the first node ($N_i$) and privately stored by a security manager, and $r_j$ is a random prime number associated with the third node ($N_j$) and privately stored by the security manager, such that $N^{-1/3e} < p_i, r_j < N^{-1/3}$;

receiving a second credential for establishing a communications link between the third node ($N_j$) and the second node ($N_k$);

receiving a chaining parameter associated with the third node ($N_j$);

computing the computed credential for establishing the communications link between the first node ($N_i$) and the second node ($N_k$) based on the first credential, the second credential, and the chaining parameter; and sending the computed credential to the first node ($N_i$) to allow the first node ($N_i$) to access the second node ($N_k$).

2. The computer program storage medium of claim 1 wherein the computing operation comprises:

multiplying the first credential, the second credential, and the chaining parameter to generate the computed credential for establishing the communications link between the first node ($N_i$) and the second node ($N_k$).

3. The computer program storage medium of claim 1 wherein the operation of receiving the first credential comprises receiving the first credential by the third node ($N_j$) from the first node ($N_i$), and the operation of receiving the second credential comprises receiving the second credential by the third node ($N_j$) from a security manager.

4. The computer program storage medium of claim 1, wherein the first node ($N_i$) is a manager and the third node ($N_j$) is a subordinate in a manager-subordinate relationship.

5. The computer program storage medium of claim 1 wherein $p_j$ is a random prime number associated with the third node ($N_j$) and privately stored by the security manager such that $N^{-1/3e} < p_{j<N}^{-1/3}$, and the operation of receiving a chaining parameter comprises:

receiving the chaining parameter equaling $(p_j r_j^2)^{-e} \bmod N$ from the security manager.

6. The computer program storage medium of claim 1 wherein the operation of receiving the first credential comprises receiving the first credential by the third node ($N_j$) from the security manager, and the operation of receiving the second credential comprises receiving the second credential by the third node ($N_j$) from the security manager.

7. The computer program storage medium of claim 1 wherein the computer process further comprises:

receiving a chaining parameter associated with the first node ($N_i$).

8. The computer program storage medium of claim 7 wherein the operation of receiving the first credential comprises computing the first credential based on the chaining parameter associated with the first node ($N_i$).

9. The computer program storage medium of claim 1 wherein the operation of receiving the first credential comprises retrieving the first credential from a storage location accessible to the third node ($N_j$).

10. The computer program storage medium of claim 1 wherein the operation of receiving the second credential comprises retrieving the second credential from a storage location accessible to the third node ($N_j$).

11. The computer program storage medium of claim 1 wherein the operation of receiving the chaining parameter comprises retrieving the chaining parameter from a storage location accessible to the third node ($N_j$).

12. A computer program storage medium encoding a computer program for executing on a computer system a computer process for generating a computed credential for establishing a communications link between a first node ($N_i$) and a second node ($N_k$) in a computing system, wherein the computing system includes at least the first node ($N_i$), the second node ($N_k$), and a third node ($N_j$), the computer process comprising:

receiving a first credential for establishing a communications link between the third node ($N_j$) and the first node ($N_i$);

receiving a second credential for establishing a communications link between the third node ($N_j$) and the second node ($N_k$), the second credential including $(p_j r_k^2)^e \bmod N$, wherein e is a public exponent, N is a public modulus, $p_j$ is a random prime number associated with the third node ($N_j$) and privately stored by a security manager, and $r_k$ is a random prime number associated with the second node ($N_k$) and privately stored by the security manager, such that $N^{-1/3e} < p_j$, $r_k < N^{-1/3}$;

receiving a chaining parameter associated with the third node ($N_j$);

computing the computed credential for establishing the communications link between the first node ($N_i$) and the second node ($N_k$) based on the first credential, the second credential, and the chaining parameter; and sending the computed credential to the first node ($N_i$) to allow the first node ($N_i$) to access the second node ($N_k$).

13. The computer program storage medium of claim 12 wherein the third node ($N_j$) is a manager and the second node is a subordinate in a manager-subordinate relationship.

14. A method of generating a computed credential for establishing a communications link between a first node ($N_i$) and a second node ($N_k$) in a computing system, wherein the computing system includes at least the first node ($N_i$), the second node ($N_k$), and a third node ($N_j$), the method comprising:

receiving a first credential for establishing a communications link between the third node ($N_j$) and the first node ($N_i$), the first credential including $(p_i r_j^2)^e \bmod N$, wherein e is a public exponent, N is a public modulus, $p_i$ is a random prime number associated with the first node and privately stored by a security manager, and $r_j$ is a random prime number associated with the third node and privately stored by the security manager, such that $N^{-1/3e} < p_i$, $r_j < N^{-1/3}$;

receiving a second credential for establishing a communications link between the third node ($N_j$) and the second node ($N_k$);

receiving a chaining parameter associated with the third node ($N_j$); and computing the computed credential for establishing the communications link between the first node ($N_i$) and the second node ($N_k$) based on the first credential, the second credential, and the chaining parameter; and sending the computed credential to the first node ($N_i$) to allow the first node ($N_i$) to access the second node ($N_k$).

15. The method of claim 14 wherein the computing operation comprises:

multiplying the first credential, the second credential, and the chaining parameter to generate the computed credential for establishing the communications link between the first node ($N_i$) and the second node ($N_i$).

16. The method of claim 14 wherein the operation of receiving the first credential comprises receiving the first credential by the third node ($N_j$) from the first node ($N_i$), and the operation of receiving the second credential comprises receiving the second credential by the third node ($N_j$) from the security manager.

17. The method of claim 14 further comprising:

receiving a chaining parameter associated with the first node ($N_i$).

18. The method of claim 17 wherein the operation of receiving the first credential comprises computing the first credential based on the chaining parameter associated with the first node ($N_i$).

19. The method of claim 14 wherein the operation of receiving the first credential comprises receiving the first credential by the third node ($N_j$) from the security manager, and the operation of receiving the second credential comprises receiving the second credential by the third node ($N_j$) from the security manager.

20. The method of claim 14 wherein the operation of receiving the first credential comprises retrieving the first credential from a storage location accessible to the third node ($N_j$).

21. The method of claim 14 wherein the operation of receiving the second credential comprises retrieving the second credential from a storage location accessible to the third node ($N_j$).

22. The method of claim 14 wherein the operation of receiving the chaining parameter comprises retrieving the chaining parameter from a storage location accessible to the third node ($N_j$).

* * * * *

UNITED STATES PATENT AND TRADEMARK OFFICE
CERTIFICATE OF CORRECTION

PATENT NO.         : 7,353,384 B2                               Page 1 of 1
APPLICATION NO.    : 10/125121
DATED              : April 1, 2008
INVENTOR(S)        : Paul Christopher Leyland et al.

It is certified that error appears in the above-identified patent and that said Letters Patent is hereby corrected as shown below:

In column 10, line 57, in Claim 1, delete "$(N_i)$" and insert -- $(N_j)$ --, therefor.

In column 12, line 7, in Claim 12, delete "$(p^i r_k^2)^e$" and insert -- $(p_j r_k^2)^e$ --, therefor.

Signed and Sealed this
Twenty-second Day of February, 2011

David J. Kappos
*Director of the United States Patent and Trademark Office*